US007202940B1

(12) United States Patent
Lam et al.

(10) Patent No.: US 7,202,940 B1
(45) Date of Patent: Apr. 10, 2007

(54) METHOD FOR DETECTION OF AN OBJECT USING CORRELATION FILTERS WITH SCORE REAFFIRMATION POST PROCESSING

(75) Inventors: Chi-Kin Lam, La Canada Flintridge, CA (US); Thomas Dean Cook, Ridgecrest, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 170 days.

(21) Appl. No.: 11/155,926

(22) Filed: Jun. 16, 2005

(51) Int. Cl.
*G01C 3/08* (2006.01)
(52) U.S. Cl. .................................. 356/4.03; 356/4.01
(58) Field of Classification Search ............... 356/4.01, 356/5.01, 5.1, 28; 342/90, 95, 96, 159; 382/103–106
See application file for complete search history.

(56) References Cited

U.S. PATENT DOCUMENTS

| 5,014,131 | A | * | 5/1991 | Reed et al. | 348/241 |
| 5,102,218 | A | * | 4/1992 | Min et al. | 356/5.01 |
| 5,946,081 | A | * | 8/1999 | Lai et al. | 356/5.05 |
| 6,750,804 | B2 | * | 6/2004 | Chen et al. | 342/89 |
| 7,136,753 | B2 | * | 11/2006 | Samukawa et al. | 701/301 |
| 2003/0035097 | A1 | * | 2/2003 | Lai et al. | 356/5.01 |

* cited by examiner

*Primary Examiner*—Thomas H. Tarcza
*Assistant Examiner*—Isam Alsomiri
(74) *Attorney, Agent, or Firm*—David S. Kalmbaugh

(57) ABSTRACT

A method and system for detecting a target which uses composition correlation filters with score reaffirmation post processing for acquiring a target. The method and system uses target decision rules that are based on comparing the dot products, or peaks, of three score reaffirmation filters and their registered LADAR image to detect a target.

20 Claims, 7 Drawing Sheets

METHOD FOR DETECTION OF AN OBJECT USING CORRELATION FILTERS WITH SCORE REAFFIRMATION POST PROCESSING

BACKGROUND OF THE INVENTION

1. Field of the Invention

The present invention relates generally to target detection and acquisition. More specifically, the present invention relates to a method and system for detection of an object/target using composition correlation filters with score reaffirmation post processing for acquiring a target.

2. Description of the Prior Art

Recognizing objects/targets in images with background objects and clutter is a challenge to existing target detection systems. One of the primary functions of automatic target recognition is to find candidate targets and separate the targets from clutter. This process is defined as target recognition. Using image data for automatic target detection, a sample of target pixels can be statistically different from background pixels in the immediate neighborhood of a candidate target. Algorithms are then devised to recognize groups of pixels as indicating a possible target to be further processed by an automatic target recognition algorithm. Conventional detection systems analyze images for pixel distortion to indicate a difference from background information or clutter, this difference being a candidate target.

Received image are filtered and processed using conventional composite correlation filtering methods to detect peaks that identify candidate targets. Composite correlation filters are discussed extensively in B. V. K. Vijaya Kumar's "Tutorial survey of composite filter designs for optical correlators" Applied Optics 31, pp 4773–4801 (1992). Problems in detecting candidate targets occur when the correlation peaks are not so readily identifiable compared with the background information or clutter. In addition, false alarms occur when clutter or other non-target data is tagged as a candidate target. Processing detection resources are wasted in these efforts to detect targets. Thus, in conventional systems, potential candidate targets cannot be readily identified or resources are ineffective and inefficient.

Accordingly, there is a need for a target detection method and system which is highly effective, reliable and efficient at identifying targets and separating the targets from background information and clutter.

SUMMARY OF THE INVENTION

The present invention overcomes some of the difficulties of the past including those mentioned in that it comprises a highly efficient and effective method and system for detection of an object using composite correlation filters with score reaffirmation post processing.

The present invention includes a novel post-processing technique developed to enhance the object recognition performance of a distortion-invariant composite correlation filter. A composite correlation filter detects target/objects with small variations in object pose and object size in an image space. The correlation filter generates a peak which is derived from LADAR (Laser Radar) range data. The peak generated by the correlation filter indicates the presence of a target if the peak height (or the peak score) exceeds a threshold.

The present invention includes a post-processing peak score reaffirmation algorithm that improves on a trade-off between the target detection and clutter detection rates. The key features of this post-processing algorithm are:

1. Target/object decision rules that are based on comparing the dot products, or peaks, of three score reaffirmation filters and their registered LADAR image. The relative peak height comparison reduces the dependency and need to normalize peak height when a peak threshold is utilized; and 2. Construction of a trimmed score reaffirmation filter by modifying a distortion-invariant correlation filter that is trained to respond to a wide range of target size and pose. A mask of border pixels is generated by utilizing a similar narrow filter with a narrower range of object size and pose. The pixels on the border of the wider filter are removed using the mask of border pixels resulting in a trimmed filter. A dot product is computed using this trimmed score reaffirmation filter.

Target attributes including location and size in image space, depression angle, and azimuth are needed and used in the selection and construction of the three score reaffirmation filters. The three score reaffirmation filters are easily constructed because of the nature of the LADAR data and the bank of azimuth-tuned filters used in the first-stage correlation filtering process.

DETAILED DESCRIPTION OF A PREFERRED EMBODIMENT

Figure 1:
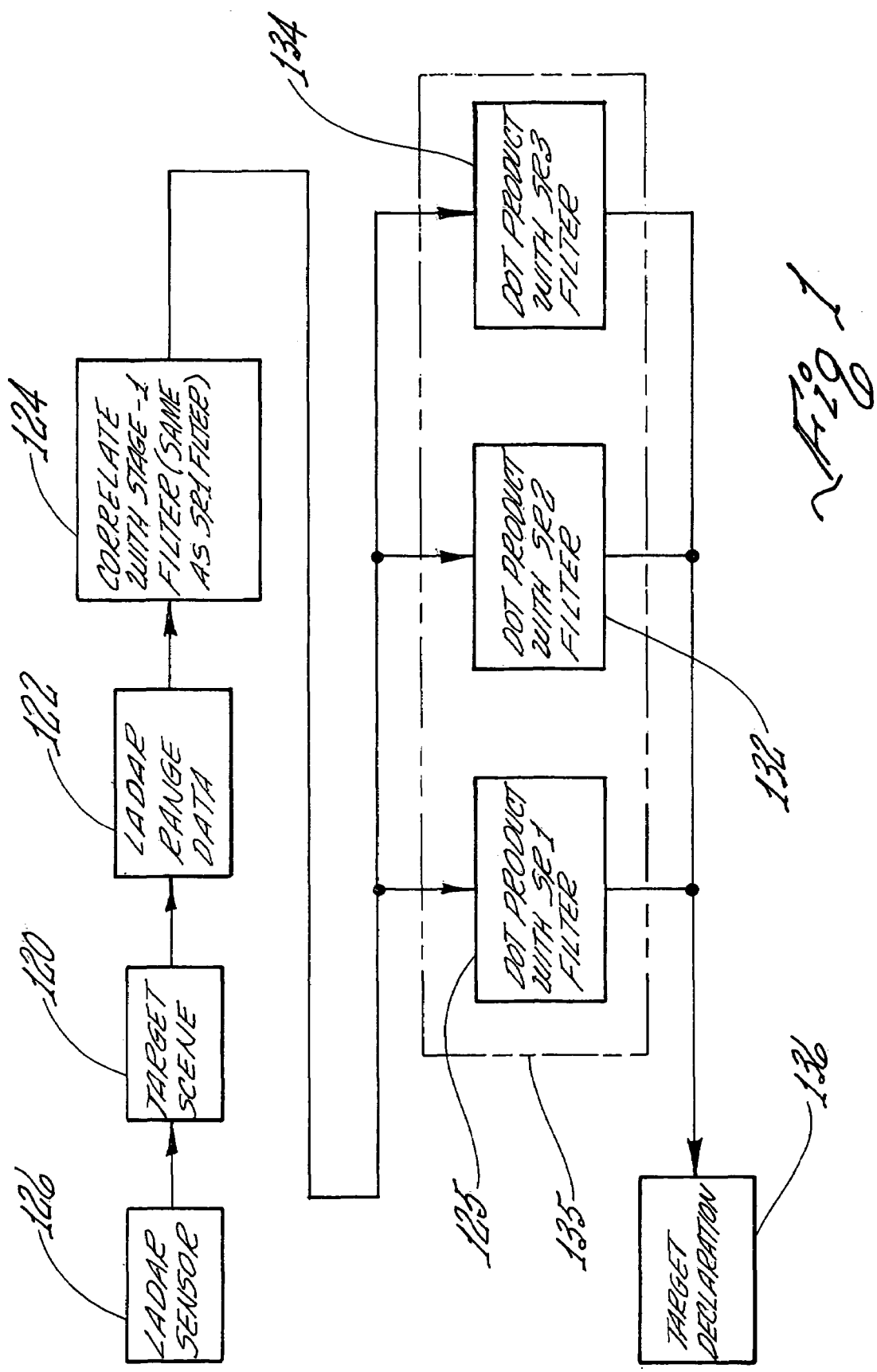
FIG. 1 is a simplified block diagram of the method and system for detection of an object using correlation filters with score reaffirmation post processing comprising the present invention.
Figure 2:
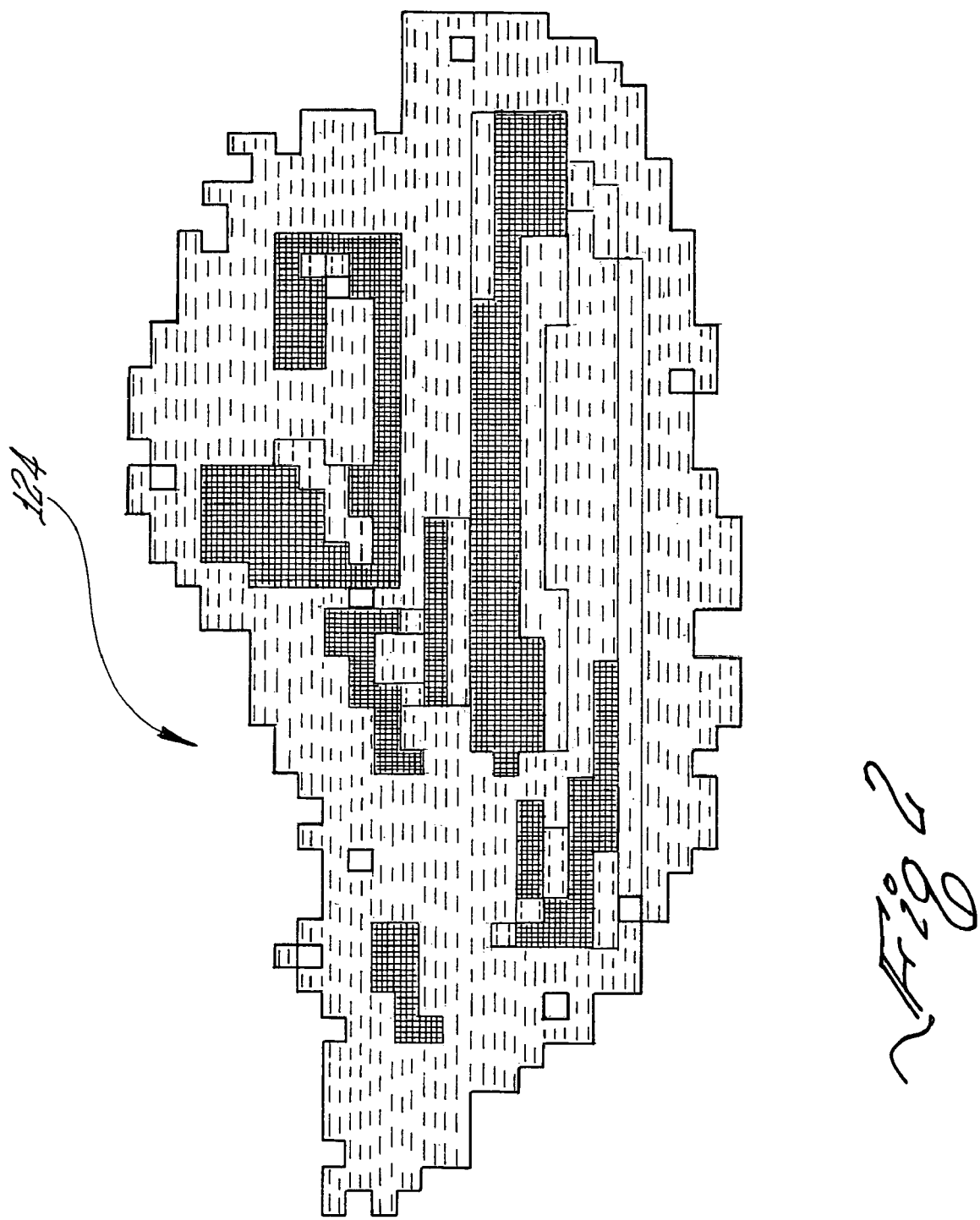
FIG. 2 illustrates an image map of a first stage correlation filter for detecting targets within a preset range, azimuth angle and depression angle. This composite filter is designed to detect targets at large variations of range and pose. This composite filter is being re-used in the score reaffirmation as the SRI filter.

Referring to FIGS. 1 and 2, the method and system of the present invention utilizes first-stage processing which is accomplished with a bank of correlation filters 124 for processing target image/LADAR range scan data 122 reflected from a target scene 120. The image/LADAR range scan data 122 for target scene 120 is generated by directing LADAR sensor 126 at the target scene 120. The bank of correlation filters used in first stage processing of the LADAR range data 122 is constructed to be tolerant to small variations in the target's range and pose.

In a preferred embodiment a first stage correlation filter 124 produces a correlation peak for targets/objects from 900 to 1100 meters, an azimuth angle from 90 to 120 degrees, and a depression angle from 8 to 10 degrees. This results in a requirement for only a small number of filters 124 to identify most target geometry. FIG. 2 depicts an image map of the first stage correlation filter which detects targets within the above preset range, azimuth angle and depression angle.

Only twelve filters 124 are needed to cover a potential target within a target scene 120 of any azimuth angle that is between 900 to 1100 meters in range and 8 to 10 degrees in depression. These twelve filters cover the 360 degrees in target azimuth angle at 30-degree intervals. All twelve filters are designed to detect targets at 900 to 1100 meters range and at 8 to 10 degrees depression. In particular, one filter is tuned for an azimuth angle from 0 to 30 degrees, a second filter is tuned for an azimuth angle from 30 to 60 degrees, and a third filter is tuned for an azimuth angle from 60 to 90 degrees. Nine additional filters are tuned for azimuth angles from 90 to 160 degrees at thirty degree increments. Similarly, only twenty four filters 124 are needed to cover a target from 700 to 1100 meters in range and 8 to 10 degrees in depression. The additional set of twelve filters 124 are designed to detect targets at 700 to 900 meters range. The trade-off for this distortion-invariance is the decrease in the ability to distinguish between clutter or background information and a target/object.

Referring to FIGS. 1, 2, 3 and 4, a second stage post-processing step is provided to substantially improve on a trade-off between target/object detection and clutter object detection. The following is used to describe this post-processing algorithm. The first stage correlation filter 24 detected a potential target within a target scene 120, and the estimated range, depression angle, and azimuth angle for the target are 1050 meters, 11 degrees, and 90 to 120 degrees, respectively. The range and depression angle for the target within target scene 120 are estimated from LADAR range scan data 122. The estimate for the azimuth angle is based on which one of the twelve azimuth-tuned correlation filters 124 provides the highest peak. Based on the estimated target range and pose, the second (SR2) and third (SR3) score reaffirmation filters were selected from a stored database.

The following describes how the three second stage score reaffirmation filters are constructed. The first score reaffirmation filter (SR1), designated by the reference numeral 125, is identical to a first stage correlation filter 124 developed for detection of targets/objects 24 within a range of 900 to 1100 meters, an azimuth of 90 to 120 degrees, and a depression of 8 to 10 degrees depression.

The second score reaffirmation filter (SR2), designated by the reference numeral 132, is a correlation filter developed to detect target/objects in a target scene 120 within a range of 950 to 1150 meters, an azimuth of 80 to 95 degrees, and a depression angle of 8 to 10 degrees. The second score reaffirmation filter 132 is almost identical to the first score reaffirmation filter 125. An important difference is that the centers of the range and depression bins are closer to the estimated values.

Figure 4:
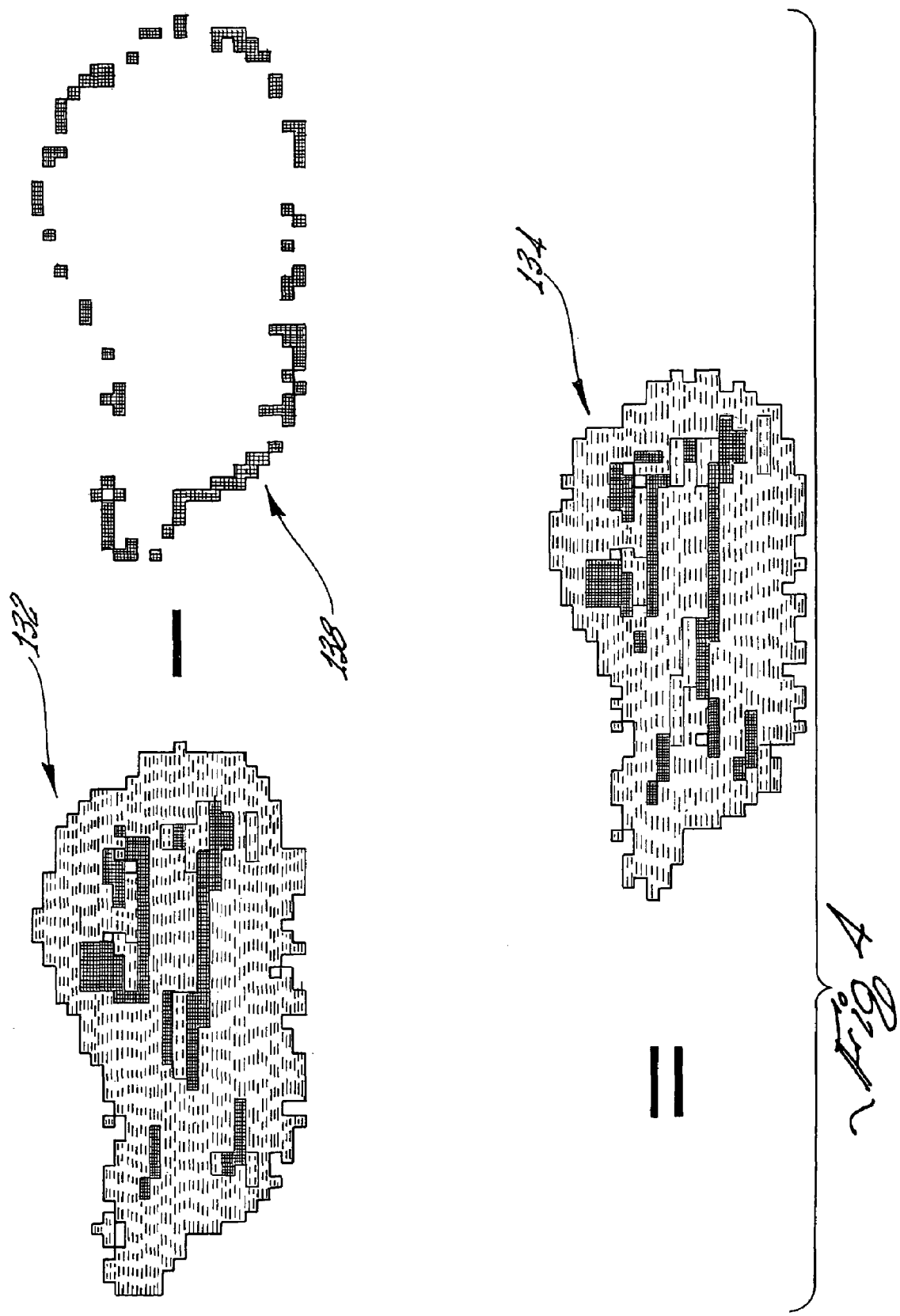
FIG. 4 illustrates a trimmed score reaffirmation filter (SR3) which is provided by modifying the filter of FIG. 3.
Figure 5A:
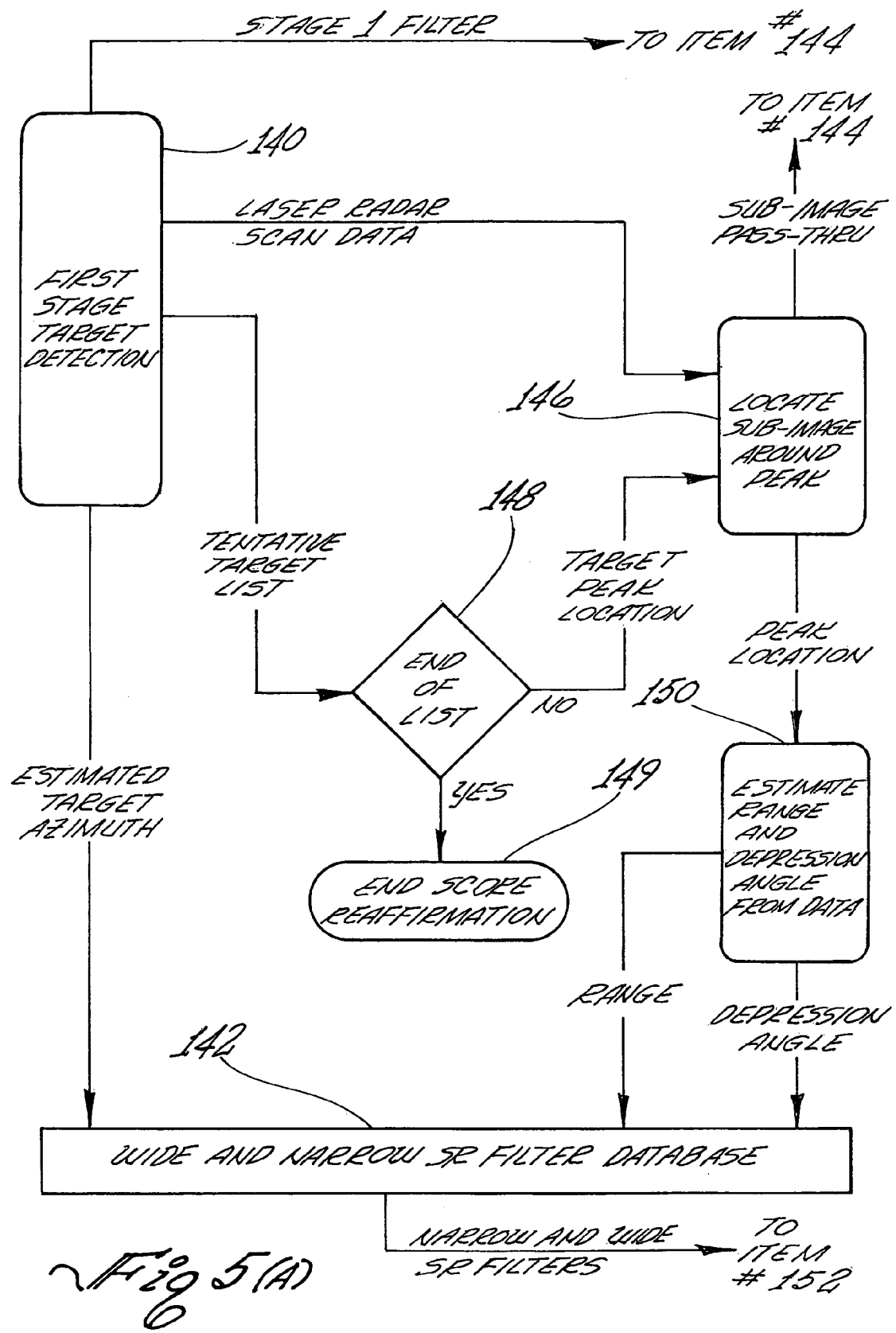
FIGS. 5(A) and 5(B) illustrate a flow chart for the score reaffirmation system and method of the present invention.
Figure 5B:
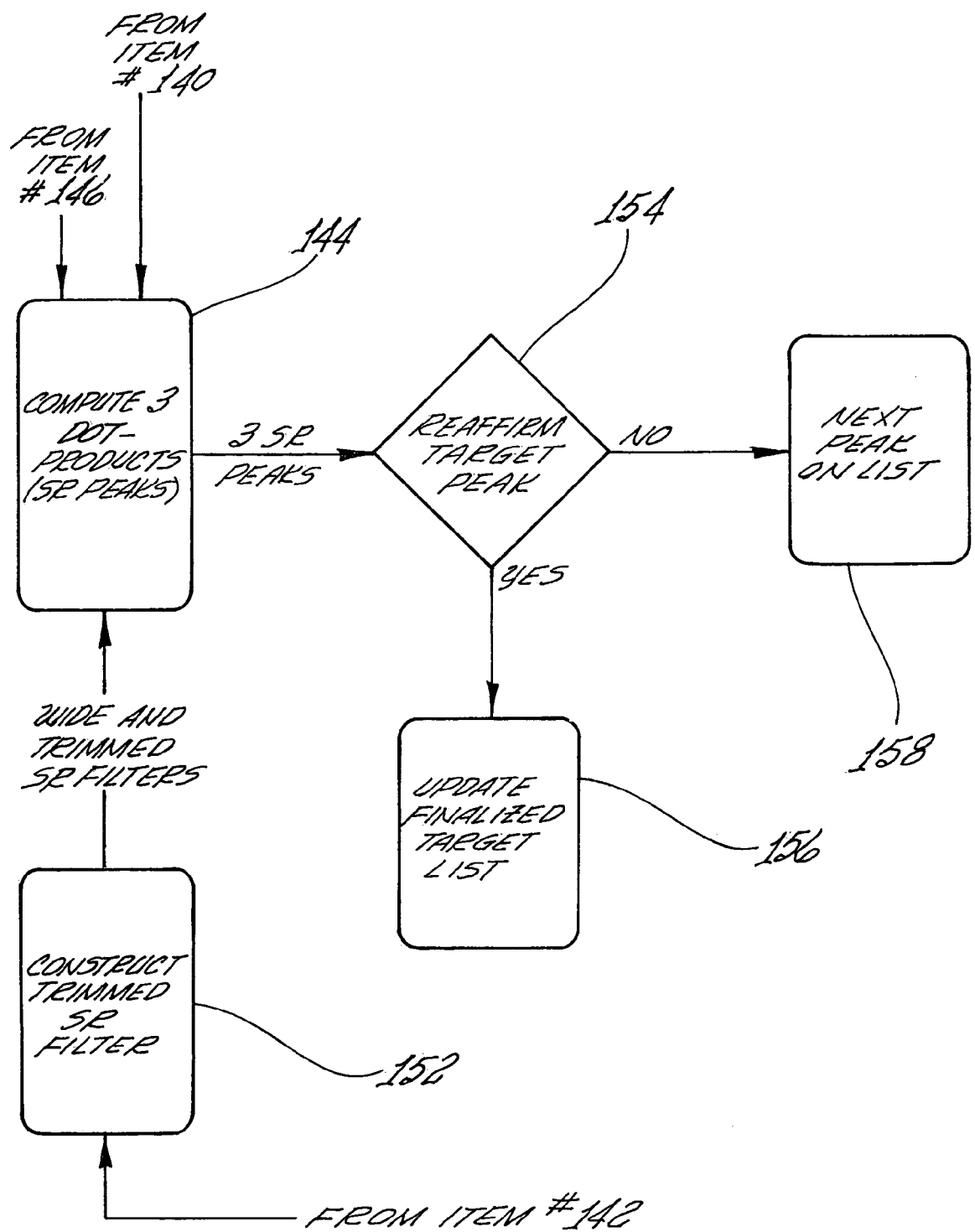
Figure 6:
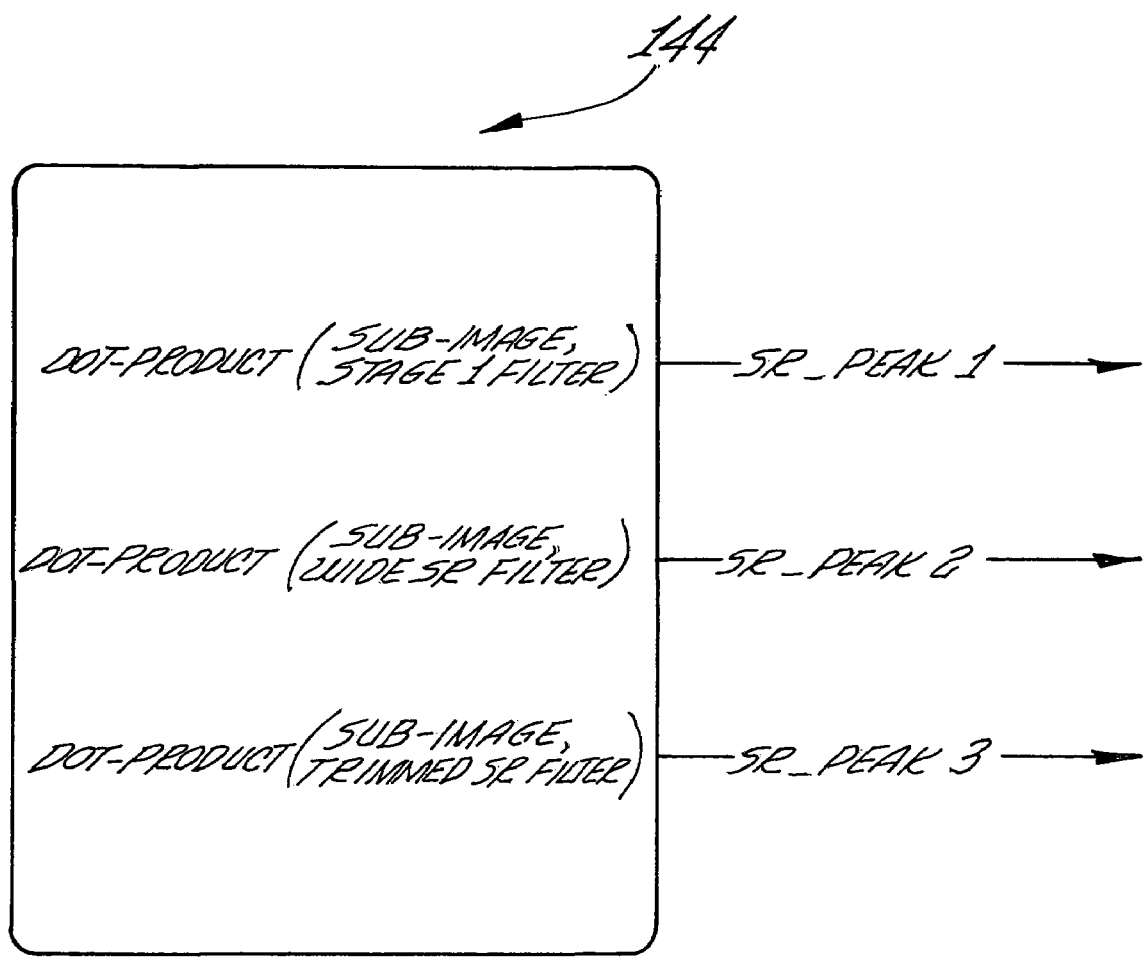
FIG. 6 is a detailed view of the compute three dot products step of FIG. 5(B).

Referring to FIG. 4, a third score reaffirmation filter (SR3), designated generally by the reference 134, comprises the second (SR2) score reaffirmation filter 132 with the pixels on the border of the filter template trimmed. The process used to determine the pixels to be removed is set forth as follows. A narrow filter having a target range from 1025 to 1075 meters, an azimuth angle from 83.5 to 91.5 degrees, and a depression angle from 8 to 10 degrees was developed and utilized for this process.

Figure 3:
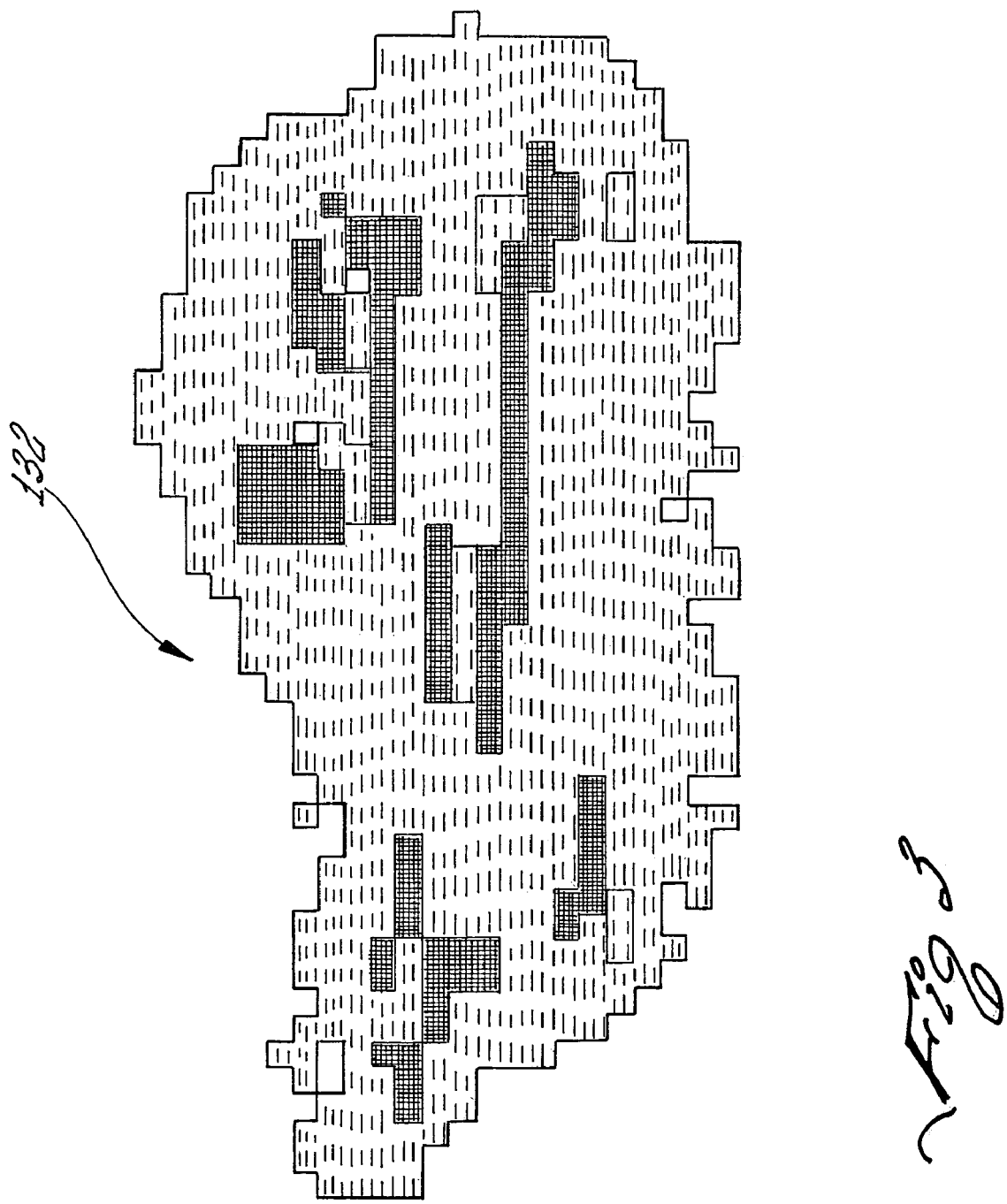
FIG. 3 illustrates an image map of a score reaffirmation correlation filter, SR2, for detecting targets within a preset range, azimuth angle and depression angle. This composite filter is designed to detect filter is centered at an estimated range and depression angle.

The mask of this narrow filter with smaller range and azimuth bins is subtracted from the mask of the SR2 filter 132, FIG. 3, to obtain a mask of border pixels 138 shown in FIG. 4. The mask of border pixels 138 is then used to trim the SR2 filter 132 to obtained score reaffirmation (SR3) filter 134. As shown in FIG. 4 the SR3 filter 134 is the SR2 filter 132 with the border pixels 138 removed.

Pixel location of the potential target within target scene 120 is obtained from the first stage correlation filter 124 including estimated target azimuth. Dot products are calculated for this registered data and each of the three score reaffirmation filters 124, 132 and 134 which generate three peak scores, SR_peak1, SR_peak2, and SR_peak3, respectively. A decision rule, which determines whether the SR_peak2 is greater than the SR_peak1 or the SR_peak3 is greater than SR_peak2, is used to reaffirm the first stage detection. For a target, generally a larger peak height will be provided by a filter that is more closely matched to the target range and pose. A reaffirmation for a target declaration occurs if the SR_peak2 is larger than SR_peak1. Similarly, when the SR3 filter 134 has the irrelevant pixels removed from the dot product calculation, a reaffirmation will occur when the SR_peak3 is larger than the SR_peak2 for the target in target scene 120. Target declaration 36 occurs at the end of the score reaffirmation post processing 135.

The key features of the post-processing algorithm are set forth as follows:

1. The algorithm for score reaffirmation post-processing 135 uses target decision rules that are based on comparing the dot products 125, 132 and 134, or peaks, of three score reaffirmation filters and their LADAR image. The relative peak height comparison reduces the dependency and need to normalize the peak height when a threshold is employed; and
2. The post-processing algorithm constructs a trimmed score reaffirmation filter 134 by modifying a distortion invariant filter 124 that is responsive to a wide range of target size and pose. A mask of border pixels 138 is constructed by providing a narrow filter with a narrower range of target size and pose. The pixels on the border of filter 132 are removed by using the narrower filter as a mask in the manner illustrated in FIG. 4. A dot product is computed using the trimmed filter 134.

The target attributes, which are location and size in image space, depression angle, and azimuth, are needed and used in the selection and construction of the score reaffirmation filters 124, 132 and 134. These attributes are relatively easy to obtain because of LADAR range data and the bank of azimuth-tuned filters used in the first-stage correlation filtering.

Referring to FIGS. 1, 5(A), 5(B) and 6, a first stage target detection 140 of a potential target in the target scene 120 initiates the score reaffirmation method of the flow chart illustrated in FIG. 1. The estimated target azimuth for potential target in target scene 120 is supplied to a wide and narrow score reaffirmation filter data base 142. Pixel location of the potential target in target scene 120 is obtained from the first stage correlation filter 124 and supplied to the compute three dot product block 144 of FIG. 5.

First stage target detection block 140 provides LADAR range scan data 122 to locate sub-image around peak block 146. The LADAR range data 122 along with a target peak location from an end of list decision block 148 are processed by locate sub-image around peak block 146 which provides a peak location for the potential target in target scene 120 to an estimate range and depression angle from data block 150. Block 146 also provides a sub-image pass thru to compute 3 Dot Products block 144. The range and depression angle for the target in scene 120 are then estimated by block 150 and supplied to the wide and narrow SR filter database 142.

Wide and narrow SR filter database 142 provides the wide SR2 filter and the narrow filter to the construct trimmed SR filter block 52. The construct trimmed SR filter block 152 creates the SR-3 filter by generating a mask of border pixels utilizing the narrow filter. The pixels on the border of the wider SR2 filter are removed using the mask of border pixels to provide the trimmed SR3 filter.

The SR1, SR2 and SR3 filters are supplied to the compute 3 Dot-Products block 144 which generate the three peak scores, SR_peak1, SR_peak2, and SR_peak3, respectively. The decision rule, which determines whether the SR_peak2 is greater than the SR_peak1 or the SR_peak3 is greater than SR_peak2, is used to reaffirm the first stage detection as shown in the flow chart by the reaffirm target peak decision block 154. A reaffirmation for a target declaration occurs when the SR_peak2 is larger than SR_peak1. When the SR3 filter 134 has the irrelevant pixels removed from the dot product calculation, a reaffirmation also occurs when the SR_peak3 is larger than the SR_peak2 for target in scene 120. Target declaration 136 occurs at the end of the score reaffirmation post processing and the update finalized target list 156 is generated. When the target peak is not confirmed then the next peak on the list (block 158) is processed. At the end the list (block 148), the end score reaffirmation (block 149) is complete.

The computer code for the Score Reaffirmation Algorithm is set forth as follows.

Computer Code of the Score Reaffirmation Algorithm

```
/* commented code fragment                                              */
/* LIST OF VARIABLES                                                    */
/*
/* azimuthAngle = running test azimuth angle at 5 degree interval       */
/* azimuth = the estimated azimuth angle from first stage processing    */
/* getOneFilen = procedure to retreive SR filter from a disk file       */
/* based on the range, depression, and azimuth under consideration      */
/* tFilter = temporary array to store the filter that is used a mask    */
/* Filter = array to store the SR filters                               */
/* ChipRange = array of ladar range data                                */
/* ChipX = array of ladar x data                                        */
/* ChipY = array of ladar y data                                        */
/* ChipZ = array of ladar z data                                        */
/* ChipTop =                                                            */
/* ChipLeft =                                                           */
/* sensorPosX =                                                         */
/* sensorPosY =                                                         */
/* sensorPosZ =                                                         */
/* GeoShaded = geoshaded ladar data                                     */
/* Filter = Score Reaffirmation filter                                  */
/* peakI = the first stage peak location in pixel space, I              */
/* peakJ = the first stage peak location in pixel space, J              */
/* PeakIStage3[i] = new peak loaction after score reaffirmation         */
/* PeakJStage3[i] = new peak loaction after score reaffirmation         */
/* peakArrayStage3[i] = dot product of SR filter and geoshaded data     */
/* loop through all azimuth angles from 0 to 360 degrees at 5 degree
        intervals */
for (i=0; i<72; i++) {
    azimuthAngle = i * 5;
/* limit tested azimuths to within 30 degrees of the estimated azimuth
        (or 180 degrees from the estimated azimuth). */
            if (abs(azimuthAngle - azimuth%180) <= 30 ||
                    abs (azimuthAngle - (azimuth%180 - 180)) <= 30 ||
                    abs (azimuthAngle - (azimuth%180 + 180)) <= 30 ||
                    abs(azimuthAngle - (azimuth%180 + 360)) <= 30) {
/* SR3 */
/* get the narrow filter to use as a mask */
            getOneFiltern(i, Filter);
/* put the mask in a temporary array */
            for(ii=0;ii<FILTER_WIDTH;ii++)
                for(jj=0;jj<FILTER_WIDTH;jj++) {
                    tFilter [ii] [jj] = Filter[ii] [jj];
                    Filter [ii] [jj] = 0.0;
                }
/* get the SR2 filter */
            getOneFilter(i, Filter);
/* apply the mask to the wider SR2 filter */
            for(ii=0;ii.<FILTER_WIDTH;ii++)
                for (jj=0;jj<FILTER_WIDTH;jj++) {
                    if ((tFilter[ii] [jj]*tFilter[ii] [jj]) < 1.0E-14F)
Filter[ii] [jj] = 0.0;
                }
                dotProduct(ChipRange, ChipX, ChipY, ChipZ,
                    ChipTop, ChipLeft, sensorPosX, sensorPosY,
                    sensorPosZ, GeoShaded, Filter, peakI, peakJ,
                    &PeakIStage3 [i], &PeakJStage3 [i],
                    &peakArrayStage3 [i], 1);
```

-continued

Computer Code of the Score Reaffirmation Algorithm

```
/* SR1 */
/*    The result here is different from those from stage 1
      processing because here the peak height is a
      simple dot product and is not scaled for range */
              for(ii=0;ii<FILTER_WIDTH;ii++)
                  for (jj=0;jj<FILTER_WIDTH;jj++) {
                      Filter [ii] [jj] = FilterUsedStageOne[ii+32] [jj+32];
                  }
              dotProduct(ChipRange, ChipX, ChipY, ChipZ,
                         ChipTop, ChipLeft, sensorPosX, sensorPosY,
                         sensorPosZ, GeoShaded, Filter, peakI, peakJ,
                         &PeakIStage1[ii], &PeakJStage1[i],
                         &peakArrayStage1[i], 1);
/* SR2 */
              getOneFilter(i, Filter);
              dotProduct(ChipRange, ChipX, ChipY, ChipZ,
                         ChipTop, ChipLeft, sensorPosX, sensorPosY,
                         sensorPosZ, GeoShaded, Filter, peakI, peakJ,
                         &PeakIStage2[i], &PeakJStage2[i],
                         &peakArrayStage2[i], 1);
          } /* if (abs(azimuthAngle − azimuth%180) <= 30 */
      } /*i*/
/* Lookup the highest peak value, among the set of peaks derived from having
applied filters representing 5 degrees of azimuth. Store parameters of the
highest peak so far as "refined" until all have been checked. (If an i-th filter
was not applied above, its peakArray[i]=0.0, so it will not be stored.) */
      *refinedHeight = 0.0;
      for (i=0; i<72; i++) {
              azimuthAngle = i * 5;
              if (peakArrayStage3[i] > *refinedHeight)
          {
          *refinedHeight = peakArrayStage3[i];
                  *refinedAzimuth = azimuthAngle;
                  *refinedPeakII = PeakIStage3[i]-CHIP_HEIGHT/4;
                  *refinedpeakJJ = PeakJStage3[i]-CHIP_HEIGHT/4;
/* Set the index of the azimuth angle with the highest peak */
                  iii = i
          }
      }
/* Decision on reaffirmation of the first stage peak */
      if (peakArrayStage2[iii] > peakArrayStage1[iii] ||
          (peakArrayStage3[iii]) > peakArrayStage2[iii])
          {
/*        add 1.5 to the peak height to make sure it is counted as a target */
                  *refinedHeight = peakArrayStage3[iii] + 1.5F;
          }
          else
          {
/*    reset the refineHeight to −3.0 to remove it from the list of targets */
                  *refinedHeight = −3.0;
          }
```

What is claimed is:

1. A method for detecting targets within a target scene comprising the steps of:

(a) generating LADAR range data of said target scene by directing a LADAR sensor at said target scene;

(b) providing said LADAR range data reflected from said target scene to a first stage correlation filter which detects said targets within a first preset range, azimuth angle and depression angle;

(c) producing a correlation peak for said targets detected by said first stage correlation filter within said first preset range, azimuth angle and depression angle, wherein said first stage correlation filter processes said LADAR range data to produce said correlation peak;

(d) providing a first score reaffirmation filter which is identical to said first stage correlation filter;

(e) providing a second score reaffirmation filter for detecting said targets within a second preset range, azimuth angle and depression angle;

(f) generating a third score reaffirmation filter which consist of said second score reaffirmation filter having a mask of border pixels of said second score reaffirmation filter removed therefrom to generate said third score reaffirmation filter;

(g) calculating dot products for said first score reaffirmation filter, said second score reaffirmation filter and said third score reaffirmation filter; and (h) comparing the dot products calculated for said first score reaffirmation filter, said second score reaffirmation filter and said third score reaffirmation filter to reaffirm a detection of said targets by said first stage correlation filter.

2. The method of claim 1 wherein said first preset range, azimuth angle and depression angle comprises a preset range of 900 to 1100 meters, an azimuth angle from 90 to 120 degrees, and a depression angle from 8 to 10 degrees.

3. The method of claim 1 wherein said second preset range, azimuth angle and depression angle comprises a preset range of 950 to 1150 meters, an azimuth angle of 80 to 95 degrees, and a depression angle of 8 to 10 degrees.

4. The method of claim 1 wherein said first stage correlation filter comprises twelve filters to detect a potential target within said target scene.

5. The method of claim 1 wherein the dot products calculated for said first score reaffirmation filter, said second score reaffirmation filter and said third score reaffirmation filter comprise first, second and third peak scores respectively for said first score reaffirmation filter, said second score reaffirmation filter and said third score reaffirmation filter.

6. The method of claim 5 wherein a decision rule compares said first peak score to said second peak score and said second peak score to said third peak score to reaffirm said targets detected by said first stage correlation filter.

7. The method of claim 5 wherein said decision rule determines whether second peak score is greater than said first peak score or said third peak score is greater than said second peak score to reaffirm said targets detected by said first stage correlation filter.

8. A method for detecting targets within a target scene comprising the steps of:
(a) generating LADAR range data of said target scene by directing a LADAR sensor at said target scene;
(b) providing said LADAR range data reflected from said target scene to a first stage correlation filter which detects said targets within a first preset range, azimuth angle and depression angle;
(c) producing a correlation peak for said targets detected by said first stage correlation filter within said first preset range, azimuth angle and depression angle, wherein said first stage correlation filter processes said LADAR range data to produce said correlation peak;
(d) providing a first score reaffirmation filter which is identical to said first stage correlation filter;
(e) providing a second score reaffirmation filter for detecting said targets within a second preset range, azimuth angle and depression angle;
(f) generating a third score reaffirmation filter which consist of said second score reaffirmation filter having a mask of border pixels of said second score reaffirmation filter removed therefrom to generate said third score reaffirmation filter wherein said mask of boarder pixels is obtained by providing a narrow filter and subtracting a mask of said narrow filter from a mask of second score reaffirmation filter;
(g) calculating dot products for said first score reaffirmation filter, said second score reaffirmation filter and said third score reaffirmation filter; and
(h) comparing the dot products calculated for said first score reaffirmation filter, said second score reaffirmation filter and said third score reaffirmation filter to reaffirm a detection of said targets by said first stage correlation filter.

9. The method of claim 8 wherein said first preset range, azimuth angle and depression angle comprises a preset range of 900 to 1100 meters, an azimuth angle from 90 to 120 degrees, and a depression angle from 8 to 10 degrees.

10. The method of claim 8 wherein said second preset range, azimuth angle and depression angle comprises a preset range of 950 to 1150 meters, an azimuth angle of 80 to 95 degrees, and a depression angle of 8 to 10 degrees.

11. The method of claim 8 wherein said first stage correlation filter comprises twelve filters to detect a potential target within said target scene.

12. The method of claim 8 wherein the dot products calculated for said first score reaffirmation filter, said second score reaffirmation filter and said third score reaffirmation filter comprise first, second and third peak scores respectively for said first score reaffirmation filter, said second score reaffirmation filter and said third score reaffirmation filter.

13. The method of claim 12 wherein a decision rule compares said first peak score to said second peak score and said second peak score to said third peak score to reaffirm said targets detected by said first stage correlation filter.

14. The method of claim 13 wherein said decision rule determines whether second peak score is greater than said first peak score or said third peak score is greater than said second peak score to reaffirm said targets detected by said first stage correlation filter.

15. The method of claim 8 wherein said narrow filter has a target range from 1025 to 1075 meters, an azimuth angle from 83.5 to 91.5 degrees, and a depression angle from 8 to 10 degrees.

16. An apparatus for detecting targets within a target scene comprising:
(a) means for generating LADAR range data of said target scene;
(b) first stage filtering means for receiving said LADAR range data of said target scene and detecting said targets in said target scene within a first preset range, azimuth angle and depression angle, said first stage filtering means producing a correlation peak for said targets detected by said first stage filtering means within said first preset range, azimuth angle and depression angle, wherein said first stage filtering means processes said LADAR range data to produce said correlation peak;
c) first score reaffirmation filtering means for detecting said targets within said first preset range, azimuth angle and depression angle, wherein said first score reaffirmation filtering means is identical to said first stage filtering means;
(d) second score reaffirmation filtering means for detecting said targets in said target scene within a second preset range, azimuth angle and depression angle;
(e) third score reaffirmation filtering means for detecting said targets within said target scene, said third score reaffirmation filtering means comprising said second score reaffirmation filtering means having a mask of border pixels of said second score reaffirmation filtering means removed therefrom to generate said third score reaffirmation filtering means wherein said mask of boarder pixels is obtained by providing a narrow filter and subtracting a mask of said narrow filter from a mask of said second score reaffirmation filtering means;
(g) means for calculating dot products for said first score reaffirmation filtering means, said second score reaffirmation filtering means and said third score reaffirmation filtering means; and
(h) means for comparing the dot products calculated for said first score reaffirmation filtering means, said second score reaffirmation filtering means and said third score reaffirmation filtering means to reaffirm a detection of said targets by said first stage correlation filtering means.

17. The apparatus of claim 16 wherein said first preset range, azimuth angle and depression angle comprises a preset range of 900 to 1100 meters, an azimuth angle from 90 to 120 degrees, and a depression angle from 8 to 10 degrees, and said second preset range, azimuth angle and depression angle comprises a preset range of 950 to 1150 meters, an azimuth angle of 80 to 95 degrees, and a depression angle of 8 to 10 degrees.

18. The apparatus of claim 16 wherein the dot products calculated for said first score reaffirmation filter, said second score reaffirmation filter and said third score reaffirmation filter comprise first, second and third peak scores respectively for said first score reaffirmation filter, said second score reaffirmation filter and said third score reaffirmation filter.

19. The apparatus of claim 18 wherein a decision rule compares said first peak score to said second peak score and said second peak score to said third peak score to reaffirm said targets detected by said first stage correlation filter.

20. The apparatus of claim 16 wherein said narrow filter has a target range from 1025 to 1075 meters, an azimuth angle from 83.5 to 91.5 degrees, and a depression angle from 8 to 10 degrees.

* * * * *